(12) United States Patent
Hassan et al.

(10) Patent No.: US 7,970,085 B2
(45) Date of Patent: Jun. 28, 2011

(54) OFDM TRANSMISSION AND RECEPTION FOR NON-OFDMA SIGNALS

(75) Inventors: Amer A. Hassan, Kirkland, WA (US); Christian Huitema, Clyde Hill, WA (US)

(73) Assignee: Microsoft Corporation, Redmond, WA (US)

( * ) Notice: Subject to any disclaimer, the term of this patent is extended or adjusted under 35 U.S.C. 154(b) by 964 days.

(21) Appl. No.: 11/899,248

(22) Filed: Sep. 5, 2007

(65) Prior Publication Data

US 2008/0279291 A1 Nov. 13, 2008

Related U.S. Application Data

(60) Provisional application No. 60/928,114, filed on May 8, 2007.

(51) Int. Cl.
*H04L 1/02* (2006.01)
(52) U.S. Cl. ........ 375/347; 375/267; 375/349; 370/208; 370/319
(58) Field of Classification Search .......... 375/260, 375/267, 285, 340, 346, 347, 349; 370/203, 370/208, 319, 344, 437, 441, 442, 464, 465, 370/480, 482, 487, 490
See application file for complete search history.

(56) References Cited

U.S. PATENT DOCUMENTS

| | | | |
|---|---|---|---|
| 4,210,780 A | 7/1980 | Hopkins et al. | |
| 5,504,775 A | 4/1996 | Chouly et al. | |
| 5,790,516 A | 8/1998 | Gudmundson et al. | |
| 5,867,478 A | 2/1999 | Baum et al. | |
| 6,175,550 B1 | 1/2001 | Van Nee | |
| 6,304,611 B1 | 10/2001 | Miyashita et al. | |
| 6,553,534 B2 | 4/2003 | Yonge et al. | |
| 6,609,039 B1 | 8/2003 | Schoen | |
| 6,654,431 B1 | 11/2003 | Barton et al. | |
| 6,726,297 B1 | 4/2004 | Uesugi | |
| 6,763,072 B1 | 7/2004 | Matsui et al. | |
| 6,810,006 B2 | 10/2004 | Michon et al. | |
| 6,870,808 B1 | 3/2005 | Liu et al. | |
| 6,882,851 B2 | 4/2005 | Sugar et al. | |
| 6,904,283 B2 | 6/2005 | Li et al. | |
| 6,934,246 B2 | 8/2005 | Park | |
| 6,934,340 B1 | 8/2005 | Dollard | |
| 6,952,454 B1 | 10/2005 | Jalali et al. | |
| 6,961,388 B2 | 11/2005 | Ling et al. | |

(Continued)

FOREIGN PATENT DOCUMENTS

EP 1 156 598 A2 11/2001

(Continued)

OTHER PUBLICATIONS

Goeckel, "Coded Modulation With Non-Standard Signal Sets for Wireless OFDM", IEEE, pp. 791-795, 1999.

(Continued)

*Primary Examiner* — Dac V Ha
(74) *Attorney, Agent, or Firm* — Wolf, Greenfield & Sacks, P.C.

(57) ABSTRACT

Methods and apparatuses for Orthogonal Frequency-Division Multiplexing (OFDM) communication of non-OFDM radio signals are disclosed. The non-OFDM radio signals are force-modulated into OFDM signals. In one example, a non-OFDM signal is received and is processed into an OFDM signal to produce a created OFDM signal. An actual OFDM signal is also received and is processed together with the created OFDM signal.

9 Claims, 5 Drawing Sheets

U.S. PATENT DOCUMENTS

| | | | |
|---|---|---|---|
| 6,976,202 | B1 | 12/2005 | Rezvani et al. |
| 6,987,729 | B1 | 1/2006 | Gopalakrishnan et al. |
| 7,012,883 | B2 | 3/2006 | Jalali et al. |
| 7,020,071 | B2 | 3/2006 | Mujtaba |
| 7,020,073 | B2 | 3/2006 | Kadous et al. |
| 7,043,023 | B2 | 5/2006 | Watanabe et al. |
| 7,043,681 | B2 | 5/2006 | Kroeger et al. |
| 7,047,032 | B2 | 5/2006 | Yun |
| 7,072,413 | B2 | 7/2006 | Walton et al. |
| 7,075,967 | B2 | 7/2006 | Struhsaker et al. |
| 7,076,246 | B2 | 7/2006 | Chitrapu |
| 7,126,984 | B2 | 10/2006 | Wang |
| 7,151,925 | B2 | 12/2006 | Ting et al. |
| 7,164,649 | B2 | 1/2007 | Walton et al. |
| 7,206,350 | B2 | 4/2007 | Korobkov et al. |
| 7,206,840 | B2 | 4/2007 | Choi et al. |
| 7,551,641 | B2 * | 6/2009 | Pirzada et al. ............... 370/465 |
| 7,800,541 | B2 * | 9/2010 | Moshfeghi ................. 342/465 |
| 2002/0141446 | A1 | 10/2002 | Koga |
| 2002/0157058 | A1 | 10/2002 | Ariel |
| 2002/0188723 | A1 | 12/2002 | Choi et al. |
| 2003/0026200 | A1 | 2/2003 | Fu et al. |
| 2003/0058786 | A1 | 3/2003 | Sato et al. |
| 2003/0123383 | A1 | 7/2003 | Korobkov et al. |
| 2003/0154233 | A1 | 8/2003 | Patterson |
| 2004/0005010 | A1 | 1/2004 | He et al. |
| 2004/0008618 | A1 | 1/2004 | Shirakata et al. |
| 2004/0027997 | A1 | 2/2004 | Terry et al. |
| 2004/0029575 | A1 | 2/2004 | Mehta |
| 2004/0151108 | A1 | 8/2004 | Claret et al. |
| 2004/0151109 | A1 | 8/2004 | Batra et al. |
| 2004/0252775 | A1 | 12/2004 | Park |
| 2004/0252781 | A1 | 12/2004 | Park |
| 2005/0002325 | A1 | 1/2005 | Giannakis et al. |
| 2005/0025039 | A1 | 2/2005 | Hwang et al. |
| 2005/0027789 | A1 | 2/2005 | Luo et al. |
| 2005/0063345 | A1 | 3/2005 | Wu et al. |
| 2005/0078759 | A1 | 4/2005 | Zhang |
| 2005/0099937 | A1 | 5/2005 | Oh et al. |
| 2005/0111462 | A1 | 5/2005 | Walton et al. |
| 2005/0117661 | A1 | 6/2005 | Kim |
| 2005/0130684 | A1 | 6/2005 | Kim et al. |
| 2005/0141649 | A1 | 6/2005 | Tanabe |
| 2005/0152466 | A1 | 7/2005 | Maltsev et al. |
| 2005/0157670 | A1 | 7/2005 | Tang et al. |
| 2005/0160428 | A1 | 7/2005 | Ayachitula et al. |
| 2005/0197132 | A1 | 9/2005 | Lee et al. |
| 2005/0228850 | A1 | 10/2005 | Zhu et al. |
| 2005/0237989 | A1 | 10/2005 | Ahn et al. |
| 2005/0245197 | A1 | 11/2005 | Kadous et al. |
| 2006/0009209 | A1 | 1/2006 | Rieser et al. |
| 2006/0034382 | A1 | 2/2006 | Ozluturk et al. |
| 2006/0045001 | A1 | 3/2006 | Jalali |
| 2006/0046716 | A1 | 3/2006 | Hofstaedter et al. |
| 2006/0078059 | A1 | 4/2006 | Ok et al. |
| 2006/0083210 | A1 | 4/2006 | Li et al. |
| 2006/0128318 | A1 | 6/2006 | Agarossi et al. |
| 2006/0135075 | A1 | 6/2006 | Tee et al. |
| 2006/0154691 | A1 | 7/2006 | Tang et al. |
| 2006/0159120 | A1 | 7/2006 | KIm |
| 2006/0171445 | A1 | 8/2006 | Batra et al. |
| 2006/0188031 | A1 | 8/2006 | Liu |
| 2006/0193295 | A1 | 8/2006 | White et al. |
| 2006/0211387 | A1 | 9/2006 | Pisek et al. |
| 2006/0211395 | A1 | 9/2006 | Waltho |
| 2006/0250944 | A1 | 11/2006 | Hong et al. |
| 2006/0269005 | A1 | 11/2006 | Laroia et al. |
| 2006/0287001 | A1 | 12/2006 | Budampati et al. |
| 2007/0009056 | A1 | 1/2007 | Yeon et al. |
| 2007/0016413 | A1 | 1/2007 | Seo et al. |
| 2007/0055501 | A1 | 3/2007 | Aytur et al. |
| 2007/0078924 | A1 | 4/2007 | Hassan et al. |
| 2007/0133387 | A1 | 6/2007 | Arslan et al. |
| 2008/0232340 | A1 | 9/2008 | Wan et al. |
| 2009/0262849 | A1 * | 10/2009 | Jo et al. .......... 375/260 |
| 2010/0208852 | A1 * | 8/2010 | Feher ............ 375/343 |

FOREIGN PATENT DOCUMENTS

| | | |
|---|---|---|
| KR | 1020050052847 A | 6/2005 |
| NZ | 505658 | 2/2003 |
| WO | WO 02093839 A2 | 11/2002 |
| WO | WO 2005125250 A1 | 12/2005 |
| WO | WO 2005076557 | 8/2007 |

OTHER PUBLICATIONS

Bletsas et al., "Efficient Collaborative (Viral) Commuinication in OFDM Based WLANS", Media Laboratory, MIT, {aggelos,lip}@media.mit.edu.

Goeckel et al., "On the Design of Multidimensional Signal Sets for OFDM Systems", IEEE, vol. 50 No. 3, pp. 442-452, Mar. 2002.

Sereni et al., "A Software Radio OFDM Transceiver for WLAN Applications", Electronic and Information Engineering Department(DIEI)—University of Perugia—Italy, pp. 1-14, Apr. 2001.

"About SDR Technology," 1 http://www.sdrforum.org/pages/aboutSdrTech/aboutSdrTech.asp, 1 pg, 2007.

"Orthogonal Frequency Division Multiple Access," Wikipedia Online Encyclopedia; retrieved from http://en.wikipedia.org/wiki/ofdma, published Nov. 25, 2006, downloaded on Dec. 12, 2006, pp. 1-3.

"Software defined radio," http://www.wipro.com/webpages/insights/softwareradio.htm, 1 pg, 2007.

"Software Defined Radio", http://www.altera.com/end-markets/wireless/software/sdr/wir-sdr.html, 4 pgs.

Atarashi, H., "Broadband packet wireless access appropriate for high-speed and high-capacity throughput," Vehicular Technology Conference, 2001, pp. 566-570, vol. 1, Issue 2001.

Baumgartner, et al., "Performance of Forward Error Correction for IEEE 802.16e," 10th International OFDM Workshop, Hamburg, Germany, Aug. 2005.

Brodersen, et al. "Corvus: a cognitive radio approach for usage of virtual unlicensed spectrum." Online. http://www.tkn.tu-berlin.de/publications/papers/CR_White_paper_final.pdf, 2004.

Cabric, et al., "A Cognitive Radio Approach for Usage of Virtual Unlicensed Spectrum," In Proc. of 14th IST Mobile Wireless Communications Summit 2005, Dresden Germany, Jun. 2005, 4 pages unnumbered.

Chiani, et al., "Ultra Wide Bandwidth Communications towards Cognitive Radio," EMC Europe Workshop, http://www-site.deis.unibo.it/Staff/giorgetti/pubblicazioni/Conferences/emc05_mcaggl.pdf, 2005, pp. 114-117, Rome, Italy.

International Search Report from International Application No. PCT/US2007/010020, Search dated Nov. 5, 2007.

International Search Report from International Application No. PCT/US2007/085556, Search dated Mar. 26, 2008.

International Search Report from International Application No. PCT/US2007/011642 ,Search dated Sep. 28, 2007.

International Search Report from International Application PCT/US2007/010021, Search dated Oct. 17, 2007.

Johnsson, "HiperLAN/2—The Broadband Radio Transmission Technology Operating in the 5 GHz Frequency Band," HiperLAN/2 Global Forum, 1999, Version 1.0.

Krenik, et al., "Cognitive Radio Techniques for Wide Area Networks," Annual ACM IEEE Design Automation Conference, Proceedings of the 42nd Annual Conference on Design Automation, 2005, pp. 409-412, San Diego, USA, ISBN:1-59593-058-2.

Lawrey, et al., "Adaptive Frequency Hopping for Multiuser OFDM," Second International Conference on Information, Communications & Signal Processing, ICICS '99, Singapore, Dec. 7-10, 1999.

Li, et al., "Clustered OFDM with Channel Estimation for High Rate Wireless Data," IEEE, 1999, pp. 43-50.

Mitola, III, et al., "Cognitive Radio an Integrated Agent Architecture for Software Defined Radio," *Royal Institute of Technology (KTH)*, Teleinformatics Electrum 204, SE-164 40 Kista Sweden, pp. title page through 304, May 8, 2000.

Mitola, et al., Absract from "Cognitive Radio: Making Software Radios More Personal," Personal Communications, IEEE, Aug. 1999, vol. 6, Issue 4, pp. 13-18, Stockholm, Sweden, ISSN: 1070-9916.

Okada, et al., "Pre-DFT Combining Space Diversity Assisted COFDM," IEEE Transactions on Vehicular Technology, vol. 50, No. 2, pp. 487-496, Mar. 2001.

Pottie, "Wireless Multiple Access Adaptive Communications Techniques," Online. http://www.ee.ucla.edu/~pottie/papers/encycl.pdf, 1999.

She, et al., "Adaptive Turbo Coded Modulation for OFDM Transmissions," Communication Technology Proceedings, 2003. ICCT 2003, Apr. 9-11, 2003, pp. 1491-1495, vol. 2, Beijing China.

Tewfik, et al., "High Bit Rate Ultra-Wideband OFDM," Global Telecommunications Conference, 2002. Globecom apos;02. IEEE, Nov. 2002, pp. 2260-2264, vol. 3.

Wahlqvist, et al., "A Conceptual Study of OFDM-based Multiple Access Schemes," Telia, Jun. 5, 1996. http://www.es.lth.se/home/oes/pdfs/etsil.pdf.

Wang, et al., "Complex-Field Coding for OFDM Over Fading Wireless Channels," IEEE Transactions on Information Theory, Mar. 2003, pp. 707-720, vol. 49, No. 3.

Wong, et al., "Multiuser OFDM with Adaptive Subcarrier, Bit, and Power Allocation," *IEEE Journal on Selected Areas in Communications*, vol. 17, No. 10, Oct. 1999, pp. 1747-1758.

Written Opinion from International Application No. PCT/US2007/010020, Search dated Nov. 5, 2007.

Written Opinion from International Application No. PCT/US2007/085556, Search dated Mar. 26, 2008.

Written Opinion from International Application No. PCT/US2007/011642, Search dated Sep. 28, 2007.

Written Opinion from International Application PCT/US2007/010021, Search dated Oct. 17, 2007.

Youngblood, "A Software-Defined Radio for the Masses, Part 1," http://www.ece.jhu.edu/~cooper/SWRadio/Yblood1.pdf, Jul./Aug. 2002, pp. 1-9.

Zhang, et al., "Adaptive OFDM System Design for Cognitive Radio," In: 11th International OFDM-Workshop, Aug. 30-31 2006, Hamburg, Germany, pp. 91-95, IEEE Communications Society.

\* cited by examiner

OFDM TRANSMISSION AND RECEPTION FOR NON-OFDMA SIGNALS

CROSS REFERENCE TO RELATED APPLICATION

This application claims the benefit of U.S. Provisional Patent Application Ser. No. 60/928,114, filed May 8, 2007, which is hereby incorporated by reference in its entirety.

BACKGROUND

Numerous current and most emerging wireless technologies are based on Orthogonal Frequency-Division Multiplexing (OFDM) where the transmitter uses an Inverse Fast Fourier Transform (IFFT) and the receiver uses Fast Fourier Transform (FFT)—both in baseband. When implemented in a Software Defined Radio (SDR), non-OFDM based schemes require a separate software module running in parallel to OFDM based schemes when simultaneous radio transmission is desired. This can cause a performance problem and increased complexity in signaling between the operating system (OS) and the hardware (HW).

SUMMARY OF INVENTION

The present invention relates to methods and apparatuses for OFDM communication of non-OFDM radio signals. To increase the effectiveness of wireless communication, and therefore the utility of mobile devices that communicate wirelessly, wireless devices may include processors and methods to allow non-OFDM signals to be processed in software configured to process OFDM signals. In this regard, the non-OFDM radio signals are force-modulated into OFDM signals and processed along with the actual OFDM.

In one embodiment, a method of operating a computing device to accommodate non-OFDM signals is disclosed. The method includes receiving a non-OFDM signal; processing the non-OFDM signal into a created OFDM signal; and processing the created OFDM signal.

In another embodiment, a method of operating a computing device to accommodate non-OFDM signals is disclosed. The method includes receiving a non-OFDM signal; processing the non-OFDM signal into an OFDM signal to produce a created OFDM signal; receiving an actual OFDM signal; and processing the actual OFDM signal with the created OFDM signal.

In still another embodiment, an apparatus for operating a computing device to accommodate non-OFDM signals is provided. The apparatus includes a first receive circuit configurable to receive a non-OFDM signal and a first processor configurable to process the non-OFDM signal to produce a created OFDM signal. A second receive circuit is configurable to receive an OFDM signal and a second processor is configurable to process the actual OFDM signal together with the created OFDM signal and to execute an FFT on the signals.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

This disclosure addresses the need in prior art systems for separate software modules running in parallel to handle both non-OFDM based schemes and OFDM based schemes when simultaneous radio transmission is desired. In one aspect, this problem is addressed by force-modulating non-OFDM signals into OFDM signals. The non-OFDM signal is received and is processed to produce a created OFDM signal. An actual OFDM signal is also received and is processed together with the created OFDM signal. In this manner, non-OFDM signals to be processed in software configured to process OFDM signals. It should be appreciated that the present invention is not limited to single access OFDM and that multiple access OFDMA may be employed.

By way of example, if a user is using a Bluetooth headset, together with browsing the Internet (e.g., on MSN) using a wireless connection, the headset is communicating wirelessly with the computer and the computer is communicating wirelessly to the Internet connection. Using Software Defined Radio (SDR), both Bluetooth modulation and the connection to the Internet can be employed. However, the Bluetooth communication employs non-OFDM transmission whereas the wireless connection to the Internet employs OFDM transmission. Accommodating for this mixed-signal is more complex with more signaling between the different radios as compared to a single-type signal between radios. The inventors have appreciated that if the non-OFDM signal (e.g., Bluetooth signal) is transformed into an OFDM or OFDM-like signal, then just one module and/or one executable file to handle the signals need be employed. Using suitable FFT and IFFT algorithms for the signals, different radios are not required.

Data is typically transmitted at high speed and is sent through a serial to parallel converter. The data is transferred from serial to a 52 parallel stream. By way of example, if data is transmitted at 52 megabit per second, each stream would be 1 megabit per second. The 52 streams are then processed via an IFFT algorithm. The signal may then be transformed from parallel to serial again and transmitted over the channel. At the receiver, the inverse operation is performed, namely the data is sent through an FFT algorithm.

Continuing with this example, at this point, the bandwidth that is available is effectively chopped into sub-channels. For example, a 20 MHz channel transmitting into 52 sub-channels, results in each channel being about 300 KHz.

According to an aspect of this invention, the SDR controller (the control channel) decides how to transmit an OFDM signal as follows. The Operating System (OS) knows that it must transmit two different wireless protocols, e.g., both WiFi and Bluetooth. That is, there is a request for transmitting in one wireless mode (e.g., WiFi) and there is another request for transmitting in another wireless mode (e.g., Bluetooth). In this case, the OS recognizes that the OFDM operation has come over 52 sub-channels and each sub-channel is equivalent to approximately 300 KHz. This information is captured by the controller of the SDR and is fed to a module that indicates transmitting the non-OFDM signal (e.g., the Bluetooth signal). The system then makes sure that the Bluetooth connection is channelized to 300 KHz. In this regard, the Bluetooth is about 1 MHz of bandwidth so data is transmitted over the Bluetooth channel and each channel is a continuous 1 MHz. With regard to the OFDM signal (e.g., the WiFi signal), the signal is transmitted over 52 sub-channels and each sub-channel is approximately 380+ KHz wide (i.e., 20 MHz divided by 52 sub-channels). In this case, the Bluetooth stream is transmitting at a certain data rate of about 1 MHz, which will require approximately 3 sub-channels. That is, the stream is split it into three sub-channels. Thus, with the OFDM signal (e.g., WiFi) being transmitted over 52 sub-channels (serial to 52 parallel streams) and the non-OFDM signal (e.g., Bluetooth) being transmitted over 3 sub-channels, a total of 55 sub-channels exist.

An IFFT of the 55 sub-channels is then performed. On the receiver side, the WiFi receiver is performing 52 sub-channel FFTs and the Bluetooth receiver is performing 3 sub-channel FFTs. In this manner, the same executable module of the SDR is employed. The same hardware is available for use and the complexity of transmitting simultaneous radio is much less in this case than transmission of Bluetooth and WiFi separately.

Thus, a signal that is otherwise non-OFDM (e.g., Bluetooth) is made to appear as though it is OFDM, which can then be processed along with the OFDM signals.

If implemented in software, the signals are software combined and is processed in the same module.

It should be appreciated that the present invention is not limited to transmitting Bluetooth and WiFi; rather the invention contemplates OFDM transmission and reception of non-OFDM signals and OFDM signals. Similarly, the sub-channels available are not limited to the example provided. Rather, the maximum number of sub-channels is limited by the processor speed.

A further example is discussed below.

In one embodiment, Wi-Fi 802.11n and Bluetooth 2.1 are embedded in a laptop using SDR. That is, there is a single RF front end that is used for both communication protocols while the baseband and MAC protocol are implemented in software.

The Wi-Fi PHY implements an OFDM modulation scheme as described in co-pending U.S. patent application Ser. Nos. 11/637,449, titled "Cognitive Multi-User OFDMA", filed Dec. 12, 2006 and 11/635,869, titled "System Capability Discovery for Software Defined Radio", filed Dec. 8, 2006, each of which is assigned to the assignee of the present application and each of which is hereby incorporated herein by reference in its entirety. The Bluetooth device implements a form of GFSK modulation. But the Bluetooth can still be communicated in an OFDM based framework.

Figure 1:
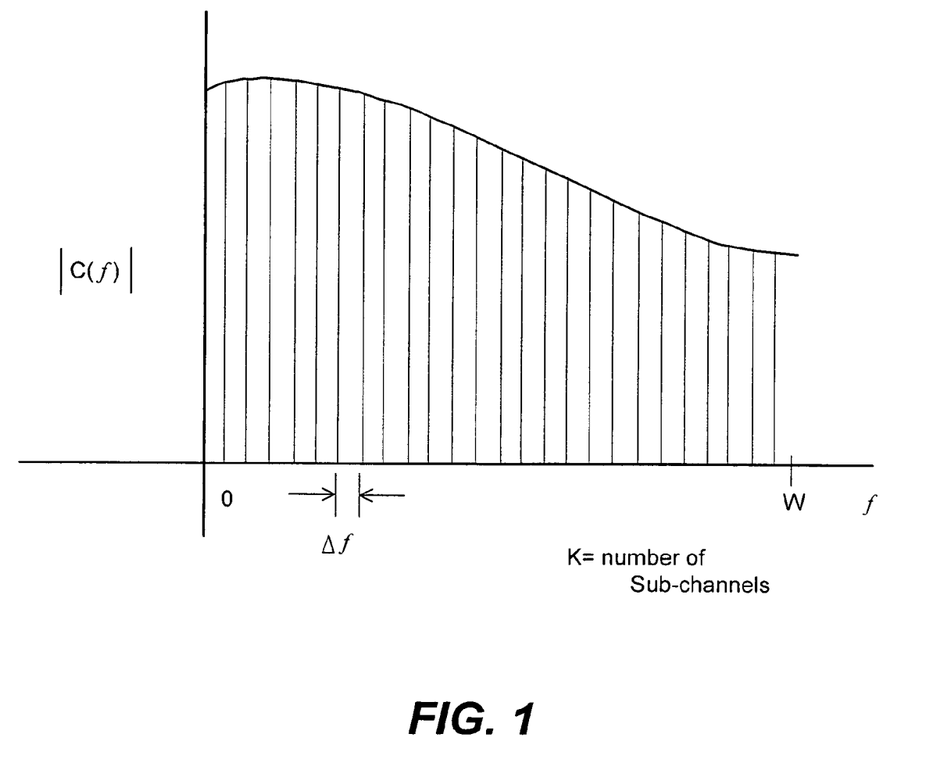
FIG. 1 is a graphical representation of a subdivision of the channel bandwidth into narrowband sub-channels of equal width.

In OFDM the available channel bandwidth W is subdivided into a number of equal-bandwidths called sub-channels, where the bandwidth of each sub-channel is sufficiently narrow so that the frequency response characteristics of the sub-channels are nearly ideal. Such a subdivision of the overall bandwidth into smaller sub-channels is illustrated in FIG. 1. Thus, K=W/Δf sub-channels is created, where different information symbols can be transmitted simultaneously in the K sub-channels. With each sub-channel, a carrier is associated as follows:

$$x_k(t) = \sin 2\pi f_k t, k=0, 1, \ldots, K-1 \quad [1]$$

where $f_k$ is the mid-frequency in the kth sub-channel.

By selecting the symbol rate 1/T on each of the sub-channels to be equal to the separation Δf of adjacent subcarriers, the subcarriers are orthogonal over the symbol interval T, independent of the relative phase relationship between sub carriers; i.e., $$\int_0^T \sin(2\pi f_k t + \phi_k)\sin(2\pi f_j t + \phi_j)dt = 0 \quad [2]$$

where $f_k - f_j = n/T$, n=1, 2, ..., independent of the values of the phases $\phi_k$ and $\phi_j$.

With an OFDM system having K sub-channels, the symbol rate on each sub carrier is reduced by a factor of N relative to the symbol rate on a single carrier system that employs the entire bandwidth W and transmits data at the same rate as OFDM. Hence, the symbol interval in the OFDM system is $T=KT_s$, where $T_s$ is the symbol interval in the single-carrier system.

Figure 2:
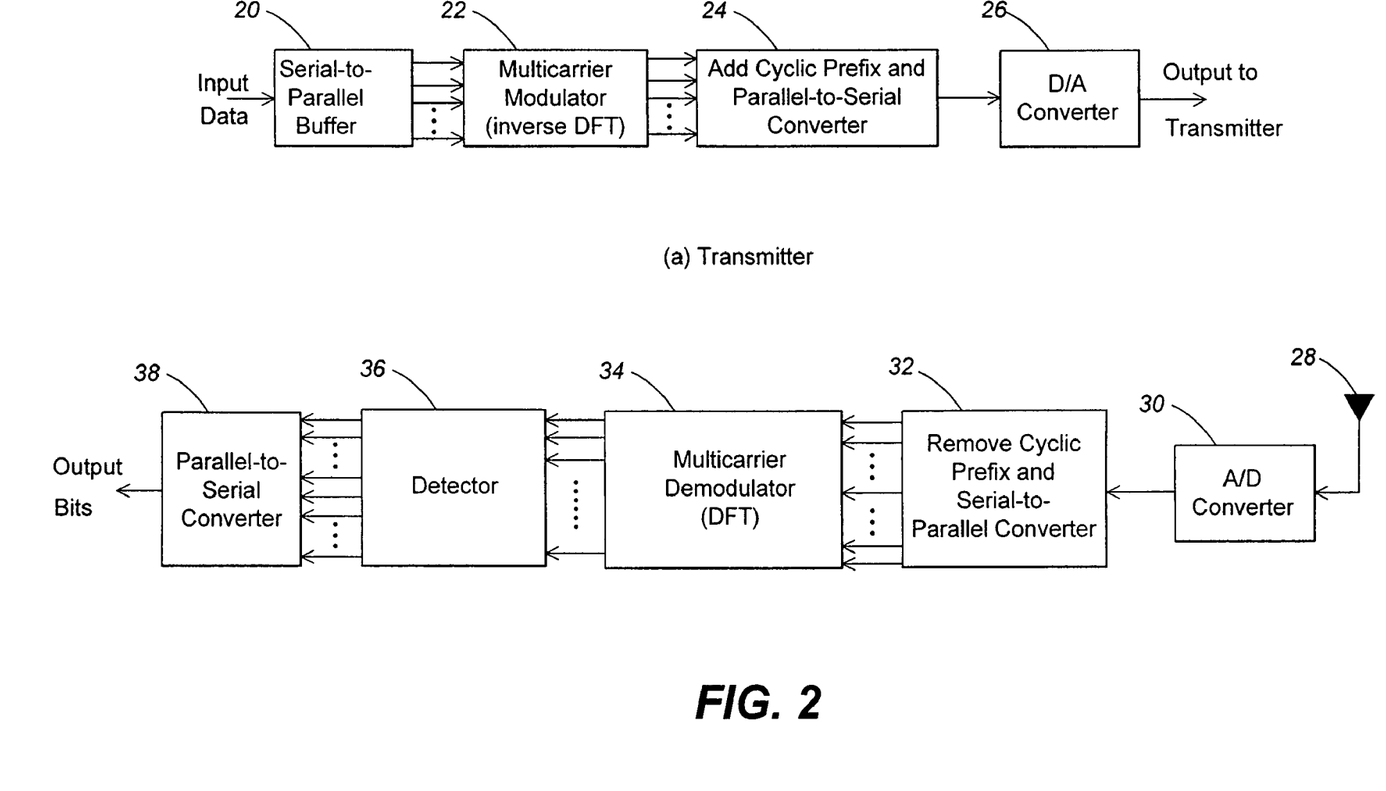
FIG. 2 is a block diagram of a multi carrier OFDM digital communication system.

It should be appreciated that the present invention is not limited to dividing the channel into a sub-channels of a certain width. Instead, the channel may be divided into sub-channels of narrower width than that described here. In this manner, the non-OFDM signal may determine how finely to divide the channels into appropriately sized sub-channels The modulator and demodulator in an OFDM system are efficiently implemented by use of the FFT algorithm to compute the DFT/IDFT. The basic block diagram of the OFDM is illustrated in FIG. 2. At block 20, a serial-to-parallel buffer subdivides the information sequence into frames of $B_f$ bits. The $B_f$ bits in each frame are parsed into K groups, where the ith group is assigned $b_i$ bits.

Hence, $$\sum_{i=1}^K b_i = B_f \quad [3]$$

A multi-carrier modulator, as illustrated at block 22, may be viewed as generating K independent QAM sub-channels, where the symbol rate for each sub-channel is 1/T and the signal in each sub-channel has a distinct QAM constellation. Hence, the number of signal points for the ith sub-channel is $M_i = 2^{b_i}$. At block 24 a cyclic prefix is added to reduce the effect of intersymbol interference from neighboring symbols. Then the parallel sequence is multiplexed back into a serial stream of bits, and inputted to a digital to analog converter (D/A) at block 26 that renders the digital symbols into analogue before up converting to the RF frequency of interest and radiating with an antenna.

The receive side is the reciprocal of transmission. The receive RF signal is intercepted by an antenna shown at 28, down converted in frequency before it is digitized by an analogue to digital converter (A/D) at block 30, multiplex from a serial stream to a parallel stream. At block 32 the prefix added in transmission is removed. An FFT is preformed, at block 34, on the parallel sequence. This followed by a detector at block 36, to decide on the bits, which is then input to a parallel to serial multiplexer, at block 38.

The complex-valued signal points corresponding the information signals on the K sub-channels may be denoted by $X_k$, k=0, 1, ..., K−1. These information symbols $\{X_k\}$ represent the values of the discrete Fourier transform (DFT) of a multi-carrier OFDM signal x(t), where the modulation on each subcarrier is QAM. Since x(t) must be a real-valued signal, its N-point DFT $\{X_k\}$ must satisfy the symmetry property $X_{N-k}=X_k^{*0}$. Therefore, we create N=2 K symbols from K information symbols by defining:

$$X_{N-K}=X^*_K, k=1, 2, \ldots, K-1$$

$$X'_0=Re(X_0)$$

$$X_N=Im(X_o) \quad [4]$$

Note that the information symbol $X_0$ is split into two parts, both of which are real. If the new sequence of symbols is denoted as $\{X_k^*, k=0, 1, \ldots, N-1\}$, the N-point inverse DFT (IDFT) yields the real-valued sequence:

$$x_n = \frac{1}{\sqrt{N}} \sum_{k=0}^{N-1} X'_k \exp(j2\pi nk/N) \quad [5]$$

$$n = 0, 1, \ldots, N-1$$

where $1\sqrt{N}$ is simply a scale factor.

This sequence $\{x_n, 0 \leq n \leq N-1\}$ corresponds to samples of the multicarrier OFDM signal x(t), consisting of K subcarriers.

Continuing with this example, at this point, the OFDM has as an input $\{X_n, 0 \leq n \leq N-1\}$ and an output $\{x_n, 0 \leq n \leq N-1\}$.

Regarding the Bluetooth modulation, the GFSK signal, which is the typical modulation protocol employed with Bluetooth, can be represented by $$s(t,\alpha)=A \cos(2\pi f_c t+\phi(t,\alpha)), \quad [6]$$

where $$A = \sqrt{\frac{2E_b}{T}}$$

$E_b$ is the energy per data bit;
$f_c$ is the carrier frequency;
$\alpha$ is the random input stream having data bits $\alpha_i$;
$\phi(t,\alpha)$ is the output phase deviation, given by $$\phi(t, \alpha) = 2\pi h_f \int_{-\infty}^{t} \sum_{i=-\infty}^{n} \alpha_i g(\tau - iT) d\tau. \quad [7]$$

In GFSK, a single bit is transmitted over multiple symbols. This may be accomplished by using a pulse shaping filter with impulse response g(t) given by $$g(t) = \frac{1}{2T}\left[Q\left(2\pi B_b \frac{t-\frac{T}{2}}{\sqrt{\ln 2}}\right) - Q\left(2\pi B_b \frac{t+\frac{T}{2}}{\sqrt{\ln 2}}\right)\right], \quad [8]$$

where Q(t) is the standard Q-function $$Q(t) = \int_t^\infty \frac{1}{\sqrt{2\pi}} e^{-\frac{\tau^2}{2}} d\tau.$$

By introducing controlled intersymbol interference, the spectral occupancy of the signal is substantially reduced.

Rewriting the above equation [7], then $$\phi(t, \alpha) = 2\pi h_f \sum_{i=n-L+1}^{n} \alpha_i q(t-iT) + \pi h_f \sum_{i=-\infty}^{n-L} \alpha_i, \quad [9]$$

where L is the length of g(t), and $$q(t) = \int_{-\infty}^{t} g(\tau) d\tau.$$

For Bluetooth with $B_b T=0.5$, L=2, which means that a single data bit is spread over two consecutive symbol intervals.

Bluetooth uses 1 MHz channelization. If an SDR is used that includes 802.11a/g/n, the sub-channels are ~384 KHz. Therefore, three sub-channels would be sufficient to cover each Bluetooth transmission/reception. In this manner, the OFDM based cognitive radio is employed for OFDM based schemes and non-OFDM based schemes. Any loss in the non-matched filter is likely to be small.

The Bluetooth signal is multiplexed in software into three separate streams, each with ⅓rd the data rate. These streams are then input to the same OFDM modulator used to transmit the 802.11n signal.

Figure 3:
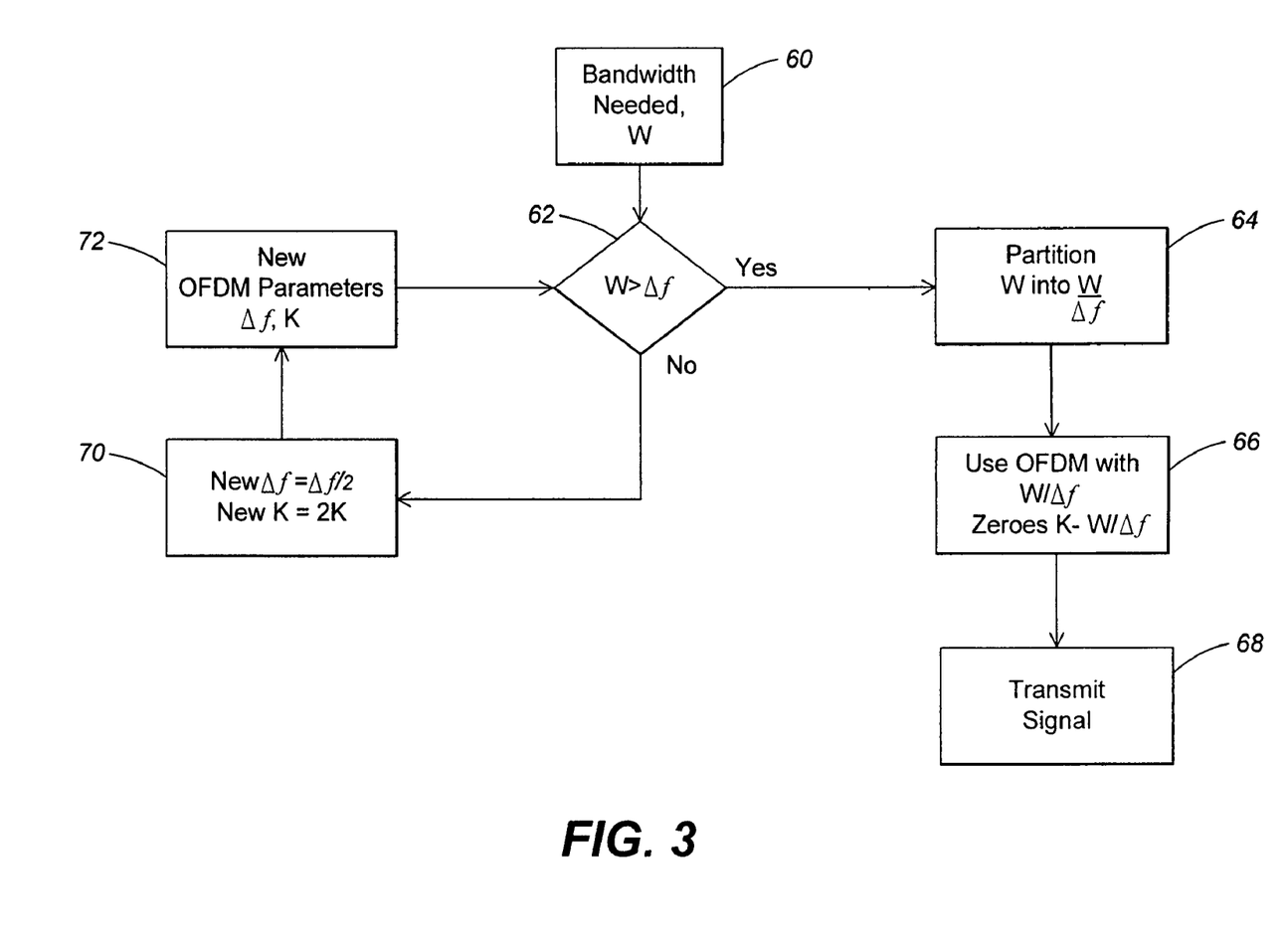
FIG. 3 is a flowchart of an illustrative process in accordance with embodiments of the invention.

FIG. 3 is an illustrative flowchart of one embodiment for transmitting data. At block 60, the bandwidth needed is represented by W. At block 62, a decision is made whether the bandwidth needed, W, is greater than the bandwidth of a sub-channel Δf. If W>Δf then the process proceeds to block 64, where the bandwidth is partitioned into K sub-channels, where K=W/Δf. At block 66, OFDM processing is performed with K number of sub-channels. At block 68, the signal is transmitted.

If the bandwidth W is not divided evenly and extra bandwidth remains that cannot take up an entire sub-channel, then, in one embodiment, the remaining bandwidth can be assumed to be a power loss. In another embodiment, the bandwidth can be divided so that the sub-channels exceed the bandwidth. In this case, the extra sub-channel can be considered noise. In yet another embodiment, as described in block 70, the sub-channel can be divided into further sub-channels such that a new Δf is provided. In this manner, on the one hand, power loss is limited and on the other hand noise is limited. In the example shown, the sub-channels are divided in half, however, it should be appreciated that the sub-channels can be divided into thirds, fourths, fifths, sixths or any other divisor, as the present invention is not limited in this respect. The process then continues at block 72 with the new parameters. Without being limited to theory, as a general rule, if either a power loss or noise (that is, the remaining bandwidth) is limited to less than about 5% to 10%, then dividing the sub-channels into further sub-channels may not be necessary.

Referring again to block 66, the signals may be processed using, for example, an FFT. In one embodiment, the FFT is programmed to process each of the sub-channels for the OFDM signals. This same FFT is used to process the non-OFDM signals, however because the FFT is programmed to process the larger number of total sub-channels for the OFDM signals, when it is time to process the non-OFDM signals, some of the sub-channels are zeroed out. For example, suppose the FFT is programmed to process 52 sub-channels for the OFDM signal, then this same FFT will attempt to process 52 sub-channels for the non-OFDM signals but there may only be 3 sub-channels having signal data. Accordingly, in one embodiment, the remaining 49 sub-channels are set to zero.

In another embodiment, the FFT can be programmed to process three sub-channels, rather than the 52 sub-channels. In this example, the non-OFDM signals are efficiently processed and no zeroing occurs, but then each set of three remaining sub-channels for the OFDM signals will be processed separately, thereby requiring many more routines of the FFT.

Figure 4:
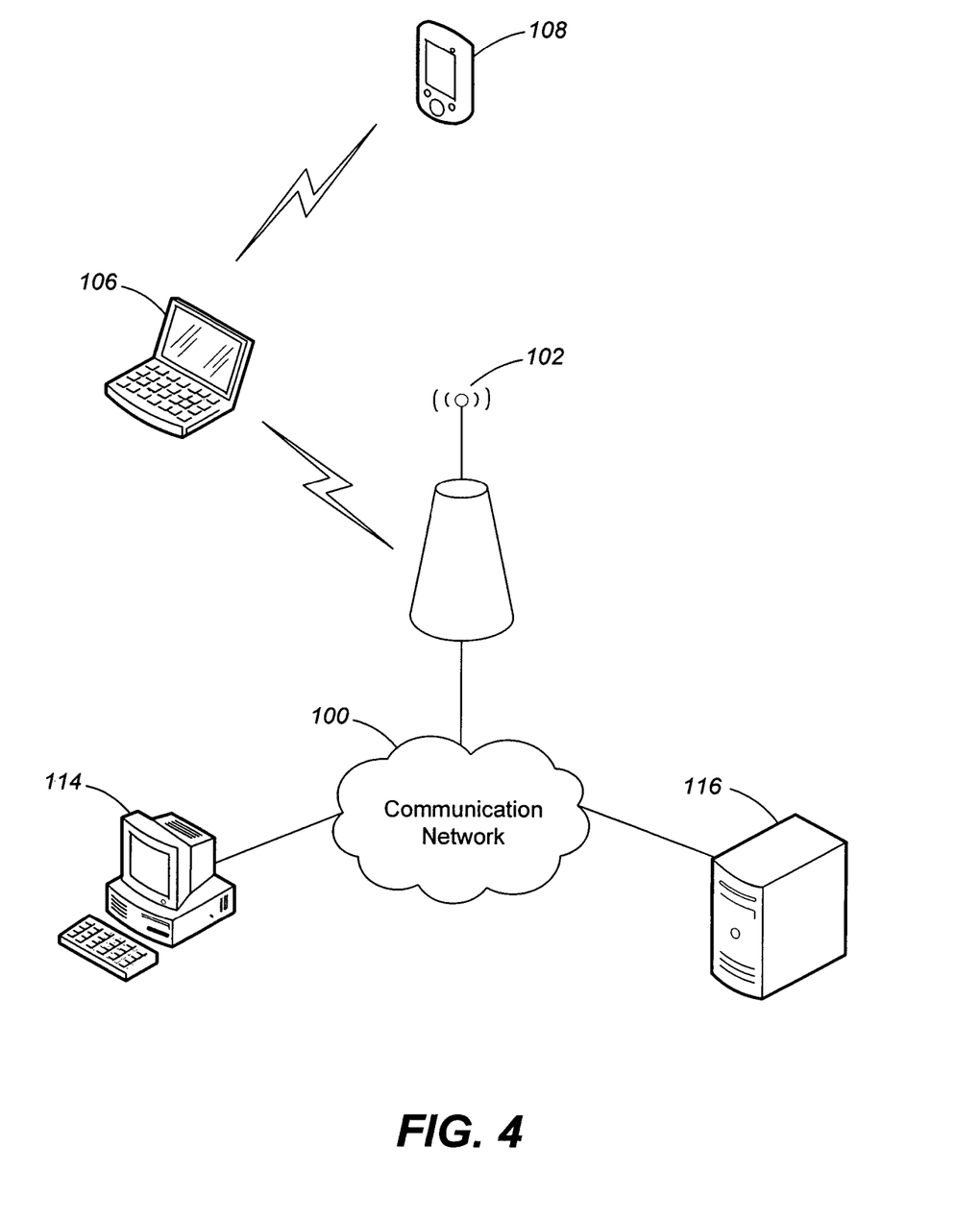
FIG. 4 is a diagram of an illustrative computer system environment in which embodiments of the invention may be implemented.

The aspects of the present invention described herein can be implemented on any of numerous computer system configurations and are not limited to any particular type of configuration. FIG. 4 illustrates one example of a computer system on which aspects of the invention can be implemented, although others are possible.

The computer system of FIG. 4 includes communication network 100, wireless access point 102, one or more wireless computing devices 106 configured to transmit and receive OFDM signals with the wireless access point 102, one or more wireless devices 108 configured to transmit and receive non-OFDM signals with the one or more wireless computing devices 106, and wired computing devices 114 and 116. Communication network 100 can be any suitable communication medium or media for exchanging data between two or more computers (e.g., a server and a client), including the Internet. The wireless client devices can be any suitable computing device with wireless communication capabilities. Several exemplary mobile computing devices can be employed, including a laptop, a personal digital assistant, and a smart phone. While FIG. 4 includes communication network 100 with wired devices 114 and 116, embodiments of the invention can be used in systems that do not include a wired network.

Figure 5:
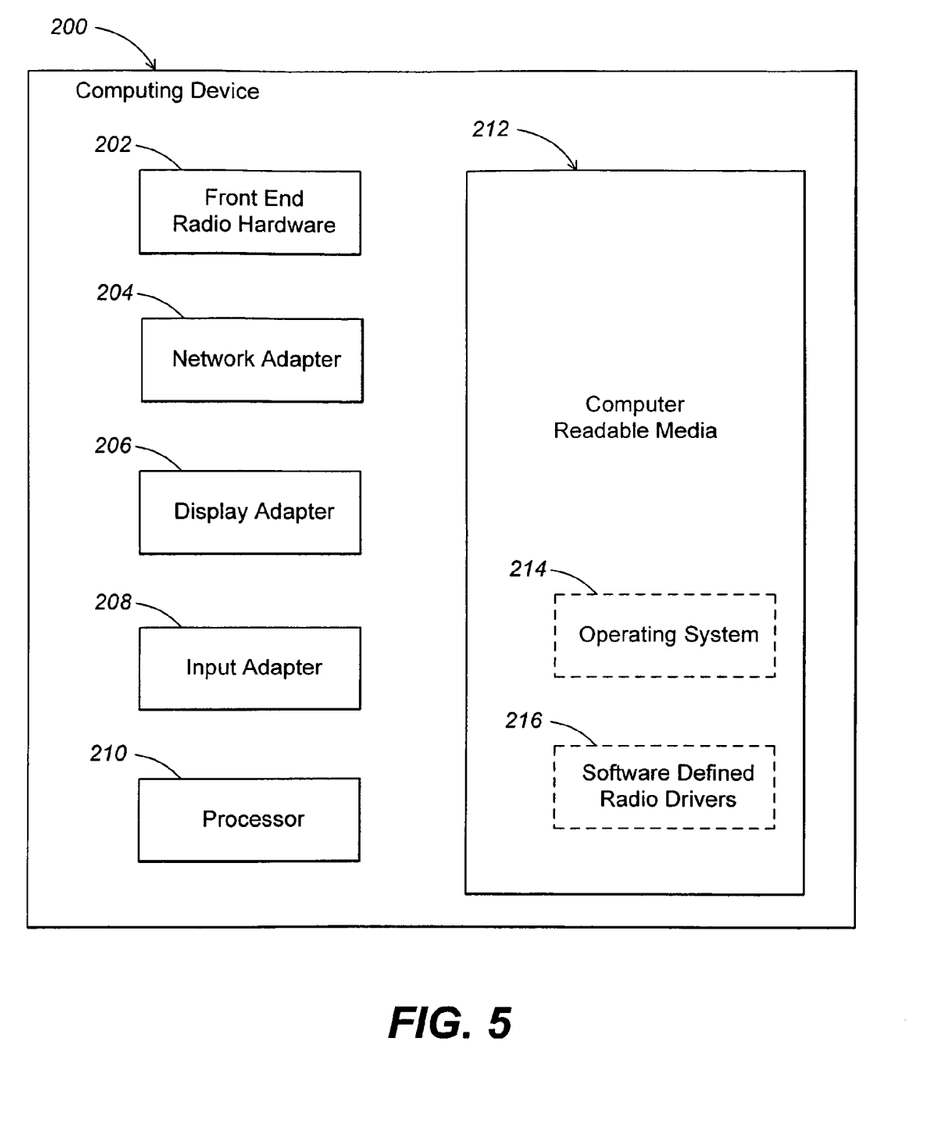
FIG. 5 is an exemplary computing device that may be used in accordance with embodiments of the invention.

FIG. 5 schematically shows an illustrative computing device 200 that may be used in accordance with one or more embodiments of the invention. FIG. 5 is intended to be neither a depiction of necessary components for a computing device to operate with embodiments of the invention nor a comprehensive depiction. Computing device 200 comprises front end radio hardware 202 to communicate wirelessly, e.g., with wireless access point 102 or with other devices 108. Device 200 also comprises a network adapter 204 to communicate over a computer network using other (possibly non-wireless) methods, a display adapter 206 to display information to a user of the device, and an input adapter 208 to receive commands from the user. Device 200 further comprises computer-readable media 212 for storing data to be processed and/or instructions to be executed by a processor 210. Processor 210 enables processing of data and execution of instructions. The data and the instructions may be stored on the computer-readable media 212 and may, for example, enable communication between components of the computing device 200. The data and instructions may comprise an operating system 214 and software defined radio drivers 216. SDR drivers 216 may comprise data and instructions to carry out many functions typically done in hardware-implemented radios. The functions performed by drivers 216 may complement the functions of front end radio hardware 202, such that all desired functions may be performed by the combination of hardware and software.

Front end radio hardware 202 may be any suitable radio hardware performing any combination of functions. These functions may include modulation (i.e., mixing a data signal into a high frequency transmission signal), filtering (i.e., parsing data out of a received signal), analog-to-digital or digital-to-analog conversion, signal generation (i.e., transmitting the data), etc. Front end 202 may be implemented to perform a minimum of the required functions that need to be performed at the hardware level, with the remaining functions being implemented by SDR drivers 216. The present function is not limited to use with systems that decide the responsibilities of the hardware and software in any particular way. Front end 202 may comprise an antenna, a programmable radio-frequency waveform generator/decoder that spans a wide radio spectrum, an array of fast analog to digital converters, and/or serializers/de-serializers to convert analog data into computer-processable bytes and vice versa. A set of tunable analog filters may also be employed to comply with mandated spectrum masks. These hardware components are merely illustrative, as invention not limited to use on systems having any particular hardware.

SDR drivers 216, in addition to performing radio functions, may transmit control instructions to the tunable circuitry of front end 202 to customize the hardware of the front end 202 according to a particular wireless protocol.

It should be appreciated that one embodiment of the invention is directed to use with a computing device having programmable circuitry (e.g., the front end hardware 202 and the SDR drivers 216) that is programmable by control instructions to generate and/or receive signals according to a wireless protocol, including, for example, the process described herein with regard to handling both OFDM and non-OFDM signals. Again, this programmable circuitry can take any suitable form and include any collection of directly programmable circuitry (e.g., a programmable processor) and circuitry that interacts with directly programmable circuitry to enable communication according to a wireless protocol.

It should be appreciated that the embodiments of the present invention described herein are not limited to being practiced with the type of computing device illustrated in FIG. 5, and that embodiments of the invention can be practiced with any suitable computing device. The front end 202 and adapters 204-208 may be implemented as any suitable hardware, software, or combination thereof, and may be implemented as a single unit or multiple units. Similarly, computer-readable media 212 may be implemented as any medium or combination of media for storing data and instructions for access by a processing device.

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or conventional programming or scripting tools, and also may be compiled as executable machine language code or intermediate code that is executed on a framework or virtual machine.

In this respect, the invention may be embodied as a computer readable medium (or multiple computer readable media) (e.g., a computer memory, one or more floppy discs, compact discs, optical discs, magnetic tapes, flash memories, circuit configurations in Field Programmable Gate Arrays or other semiconductor devices, etc.) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method of operating a computing device to accommodate non-Orthogonal Frequency-Division Multiplexing signals (non-OFDM signals), the method comprising:
   a) receiving a non-OFDM signal;
   b) processing the non-OFDM signal into a created OFDM signal;
   c) processing the created OFDM signal;
   d) transmitting OFDM and non-OFDM signals; and
   e) processing the non-OFDM signals to transmit over a first set of sub-channels, processing the OFDM signals to transmit over a second set of sub-channels and performing an Inverse Fast Fourier Transform (IFFT) of the signals.

2. The method of claim 1, wherein the method is performed, at least in part, in software defined radio.

3. The method of claim 1, wherein receiving the non-OFDM signal comprises receiving a wireless signal in a Bluetooth format.

4. The method of claim 1, further comprising receiving the signals, combining the first and second sets of sub-channels and performing a Fast Fourier Transform (FFT) of the signals from the combined sets of sub-channels.

5. A computer-readable medium having computer-executable instructions, the computer-executable instructions being adapted to perform, when executed, the method of claim 1.

6. A method of operating a computing device to accommodate non-Orthogonal Frequency-Division Multiplexing signals (non-OFDM signals), the method comprising:
   a) receiving a non-OFDM signal by receiving a wireless signal in a Bluetooth format;
   b) processing the non-OFDM signal into an OFDM signal to produce a created OFDM signal;
   c) receiving an actual OFDM signal by receiving a wireless signal in a WiFi format; and
   d) processing the actual OFDM signal with the created OFDM signal.

7. The method of claim 6, wherein the method is performed, at least in part, in software defined radio.

8. A computer-readable medium having computer-executable instructions, the computer-executable instructions being adapted to perform, when executed, the method of claim 6.

9. A method of operating a computing device to accommodate non-Orthogonal Frequency-Division Multiplexing signals (non-OFDM signals), the method comprising:
   a) receiving a non-OFDM signal;
   b) processing the non-OFDM signal into an OFDM signal to produce a created OFDM signal;
   c) receiving an actual OFDM signal;
   d) processing the actual OFDM signal with the created OFDM signal;
   e) transmitting OFDM and non-OFDM signals, processing the non-OFDM to transmit over a first set of sub-channels, processing the OFDM to transmit over a second set of sub-channels and performing an Inverse Fast Fourier Transform (IFFT) of the signals.

* * * * *

UNITED STATES PATENT AND TRADEMARK OFFICE
CERTIFICATE OF CORRECTION

PATENT NO.         : 7,970,085 B2
APPLICATION NO.    : 11/899248
DATED              : June 28, 2011
INVENTOR(S)        : Amer A. Hassan et al.

It is certified that error appears in the above-identified patent and that said Letters Patent is hereby corrected as shown below:

In Face page, in field (54), under "Title", column 1, line 2, delete "NON-OFDMA" and insert -- NON-OFDM --, therefor.

In column 1, line 2, delete "NON-OFDMA" and insert -- NON-OFDM --, therefor.

Signed and Sealed this
Twenty-third Day of August, 2011

David J. Kappos
*Director of the United States Patent and Trademark Office*